Aug. 2, 1955     M. KESSLER     2,714,525

FLEXIBLE DRIP MOLDING

Filed March 19, 1953

INVENTOR

MILTON KESSLER

BY *Max L. Libman*

ATTORNEY

United States Patent Office 2,714,525
Patented Aug. 2, 1955

2,714,525

FLEXIBLE DRIP MOLDING

Milton Kessler, Youngstown, Ohio

Application March 19, 1953, Serial No. 343,321

4 Claims. (Cl. 296—107)

This invention relates to a flexible drip molding for use with fabric covering material, and more particularly to such a drip molding for use with fabric convertible tops for automobiles.

The provision of a drip molding for convertible tops has presented a difficult detail problem for the makers of such tops, as evidenced by the lack of such a molding on the convertible tops of automobiles manufactured to date, although all closed or hard-top cars are provided with a metal drip molding in the form of a channel running from the edge of the top around the top of the door and window openings, which attest the desirability of such a molding. Without a drip molding, much of the water striking the top during a rain will find its way into the interior of the vehicle if a window is opened, wetting the seats and floor, while if a door is opened the back and neck of a person passing through the door will be wetted by water dripping down from the edge of the top. However, a drip molding for a convertible top must be flexible enough to withstand the constant folding of the top, must be able to stand up under a great temperature range running from heat that would burn the skin when the car stands out in the hot sun, to the coldest below-zero temperatures encountered in the winter, without cracking when flexed. Attempts have been made to provide flexible molding for convertible tops by using a U-shaped channel, one leg of which is sewed to the bottom edge of the fabric, and using metal wire reinforcing at various points throughout the length of the channel, also using U-shaped clips to keep the channel in shape. Such channels are relatively expensive to manufacture, and difficult and expensive to install, and have not been accepted by the industry despite the need for a solution to this problem. I have discovered that the presence of imbedded wires impairs the longitudinal elasticity of the drip molding; when the top is folded, the portion containing the wire cannot stretch as it otherwise would and therefore all the strain is taken by the non-reinforced portion, which means that this portion is stretched more than it would be without the wires, with consequent shortening of the life of the molding.

It is a primary object of my invention to provide a flexible drip molding which obviates the above disadvantages and which is simple in construction and economical to manufacture.

It is a further object to provide an improved flexible drip molding for fabric tops which is easy and inexpensive to install and which eliminates the need for the usual gimp binding at the fabric edge. A related object is to pro- give a gimp channel in a flexible drip molding which automatically positions the edge of the fabric so that the fabric can be correctly sewed or otherwise fastened to the drip molding without special attention to the positioning of the two elements, even by relatively unskilled or inexpert help.

Another difficulty is found with prior art flexible drip moldings when it is attempted to bend them around the corner of a door or window opening. This bend is made in a plane perpendicular to the bottom of the drip channel, and tends to compress the bottom and stretch the top of the channel walls. One of these walls, however, is sewed or otherwise fastened to the fabric—the other wall therefore tends to collapse against the first wall, thus closing the channel. I overcome this difficulty by making my improved molding on a slight curve, which does not prevent the length of molding required for ordinary use in an automobile from following a straight edge of the material without appreciable distortion, but permits a reasonable curvature around the door opening without causing the side wall to collapse against the fabric. This feature is an important advantage of my invention.

The specific nature of the invention, as well as other objects and advantages thereof, will clearly appear from a description of a preferred embodiment as shown in the accompanying drawing in which.

Figure 1:
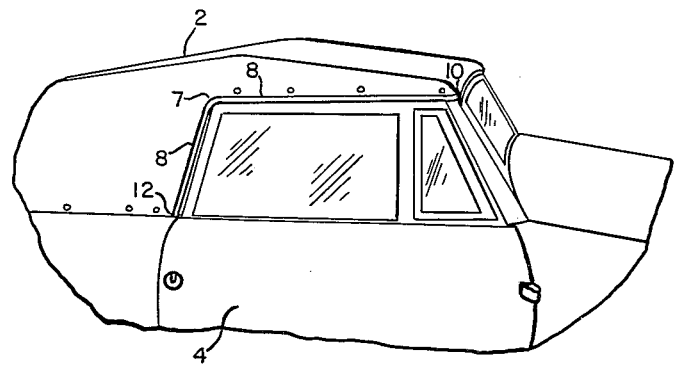
Fig. 1 is a fragmentary perspective view of a convertible type automobile equipped with a drip molding according to the invention.

Referring to Fig. 1, a typical installation employing my drip molding is shown in connection with an automobile having a fabric top 2, of the convertible or let-down type, which in modern cars is usually power-operated to fold and unfold for converting the vehicle to open or closed use. The vehicle has side doors 4 around the top of which the fabric top 2 fits snugly when raised as shown.

Figure 2:
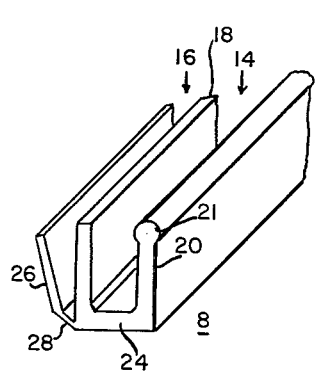
Fig. 2 is an enlarged fragmentary perspective view of a piece of unattached drip molding according to the invention, showing the method of construction.

The flexible drip molding 8 is fastened to the top between points 10 and 12, and serves to control the drip from the top when it is raining, and prevent it from entering the car or falling onto a person passing through the door. Fig. 2 shows the detailed construction of the drip molding 8, which comprises a drip channel 14 and a gimp channel 16 having a common wall 18. The drip channel 14 is of relatively heavy construction, possessing walls 18 and 20 and a bottom 24, all of sufficient thickness so that the channel will be sufficiently rigid to retain its shape whenever the top is raised, even though it may be distorted when the top is lowered due to the folding of the top fabric in the latter state. Plastic materials having the desired characteristics are available and include such elastomeric materials as the vinyl resins, which can withstand the desired range of temperatures and are suitable for extrusion molding in a wide range of solid colors and which are not subject to chipping or peeling. It will be noted that the improved drip molding has a uniform cross-section throughout its length and is therefore suitable for extrusion processing, which, together with the absence of built-in metal reinforcing also makes the product extremely inexpensive. A rounded and thickened edge or bead 21 is provided for wall 20 both to improve the rigidity and to prevent edge tearing when the top is folded.

Figure 3:
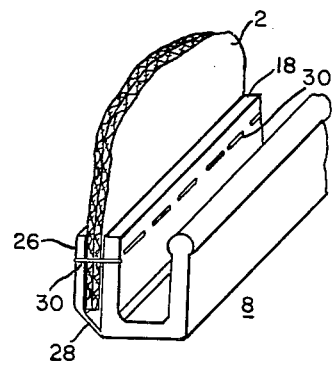
Fig. 3 is an enlarged fragmentary perspective view partly in section showing one manner of attaching the drip molding to the top fabric.

The gimp channel 16 is formed by wall 18 of the drip channel and a third wall 26 joined to wall 18 at 28 by a thinner portion which serves as the bottom of the gimp channel. The thinning of portion 28 leaves this portion quite flexible and permits ready adjustment of the walls of the gimp channel to fabrics of varying thickness, as can be seen in Fig. 3, where a double thickness fabric top 2 is shown seated in the gimp channel and fastened thereto by stitching 3. It will be apparent that instead of stitching, any other suitable form of fastening may be employed, such as riveting, stapling or cementing. However, stitching has been found adequate and is inexpensive and easy to apply.

It will be noted that the usual gimp binding, comprising a U-shaped strip of fabric sewed to the edge of the top material, can be omitted with my new molding due to the gimp channel serving this function. The gimp channel serves also to readily position the drip molding 8 with respect to the edge of the fabric without requiring the operator to exercise particular care to line up the two before sewing them together. Thus not only is the gimp binding eliminated, but the process of assembly of the molding and fabric is definitely facilitated, making for considerable economy in manufacturing the top as well as in the cost of the gimp molding.

Figure 4:
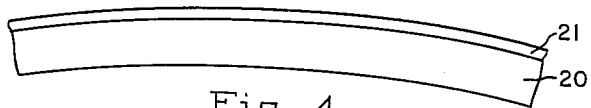
Fig. 4 is a side view of a section of the drip molding of Fig. 2, showing the curvature for preventing wall collapse.
Figure 5:
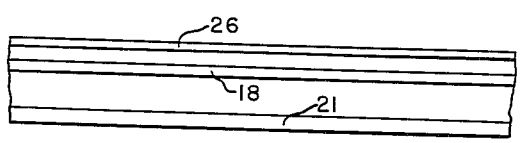
Fig. 5 is a top view of the molding shown in Fig. 4.

In bending the molding around the corner of the door opening at point 7 in Fig. 1, the wall 20 and particularly bead 21 is stretched more than the rest of the molding. As walls 18 and 26 are fastened to fabric 2, which is heavy and relatively inelastic, all of the stretch must be taken up by wall 29, with the result that with ordinary straight molding, bead 21 tends to collapse against wall 18, thus closing the drip channel at the bend 7. I have found that this can be prevented by making the molding 8 with a slight curvature as shown in Fig. 4. The radius of curvature is typically in the order of 20 inches, but may be varied somewhat to suit the dimensions of the drip molding and of the bend to which it must conform. This slight curvature does not cause distortion on the straight portions of the fabric, that is, at the top and sides of the door opening, as the elasticity of the material enables it to accommodate itself to the slight strain produced by forcing the molding to follow a straight line. However, the curvature produces sufficient relief from tension, in going around a bend 7 of reasonable radius of curvature, such as is found in standard automobile construction, so that the channel stays open around the bend, thus overcoming the difficulty.

While I have shown the manner of employing the new drip molding in connection with a vehicle top, it will be appreciated that the invention is not restricted to this use, but will also be useful in connection with any fabric or sheet of rain-protective material such as used in tents, etc.

It will be apparent that the embodiments shown are only exemplary and that various modifications can be made in construction and arrangement within the scope of my invention as defined in the appended claims.

I claim:

1. A flexible drip molding for a fabric rain covering consisting entirely of a continuous strip of flexible molding comprising a water-receiving channel-shaped member having a front and a rear wall, joined at the bottom to form said channel-shaped member and a smaller fabric-receiving channel formed between said rear wall and a third wall integrally joined at its lower edge to said rear wall at the bottom edge of the latter, the whole comprising a homogeneous, flexible, unitary member.

2. The invention according to claim 1, said molding being inherently curved in a plane perpendicular to the bottom of the drip channel so that the bottom of the channel lies on a smaller circumference than the top of the channel when the molding is in unstressed condition.

3. The invention according to claim 2, the junction of said third wall and said rear wall of the water-receiving channel being of very flexible, thin-walled construction to adapt itself to fabrics of various thicknesses.

4. In combination with a sheet of flexible rain-protective material having inner and outer sides and a cut edge, a unitary flexible all-plastic drip molding having two adjacent U-shaped channels separated by a common side wall, one channel having a bottom wall of substantial width serving as a gutter element and the other channel being of no greater width than the thickness of the sheet, the edge of said sheet being received in said other channel with the common wall on the outer side of the sheet, and means for fastening the walls of said other channel to the opposite sides of the sheet retained therein.

References Cited in the file of this patent

UNITED STATES PATENTS

| | | |
|---|---|---|
| 1,961,352 | Hall | June 5, 1934 |
| 2,015,547 | Carr | Sept. 24, 1935 |
| 2,093,614 | Lynch | Sept. 21, 1937 |
| 2,218,814 | Duffy | Oct. 22, 1940 |
| 2,524,171 | Karsted | Oct. 3, 1950 |
| 2,572,592 | Brandt et al. | Oct. 23, 1951 |
| 2,671,935 | Flues | Mar. 16, 1954 |

FOREIGN PATENTS

| | | |
|---|---|---|
| 108,418 | Great Britain | Aug. 9, 1917 |